(12) United States Patent
Lange et al.

(10) Patent No.: US 9,262,594 B2
(45) Date of Patent: Feb. 16, 2016

(54) TAMPER EVIDENCE PER DEVICE PROTECTED IDENTITY

(75) Inventors: Sebastian Lange, Seattle, WA (US); Victor Tan, Seattle, WA (US); Adam G. Poulos, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1685 days.

(21) Appl. No.: 12/016,934

(22) Filed: Jan. 18, 2008

(65) Prior Publication Data

US 2009/0187772 A1    Jul. 23, 2009

(51) Int. Cl.

| G06F 21/10 | (2013.01) |
| H04L 29/06 | (2006.01) |
| H04L 9/08 | (2006.01) |
| H04W 12/06 | (2009.01) |
| H04W 12/08 | (2009.01) |
| G06F 21/62 | (2013.01) |
| H04N 7/16 | (2011.01) |
| H04N 21/4623 | (2011.01) |

(52) U.S. Cl.
CPC ............ *G06F 21/10* (2013.01); *G06F 21/6218* (2013.01); *H04L 9/0825* (2013.01); *H04L 63/0853* (2013.01); *H04N 7/165* (2013.01); *H04N 21/4623* (2013.01); *H04W 12/06* (2013.01); *H04W 12/08* (2013.01); *G06F 2221/0704* (2013.01)

(58) Field of Classification Search
CPC ............ G06F 21/10; G06F 2221/0704; G06F 21/6218; H04L 63/0853; H04L 9/0825; H04W 12/06; H04W 12/08

USPC ......... 713/156, 168, 175, 184, 187, 193, 194; 726/26; 380/277; 709/229
See application file for complete search history.

(56) References Cited

U.S. PATENT DOCUMENTS

| 5,696,824 A * | 12/1997 | Walsh ............................. 705/75 |
| 6,144,848 A * | 11/2000 | Walsh et al. .................. 455/419 |
| 6,560,339 B1 * | 5/2003 | Iwamura ....................... 380/201 |

(Continued)

FOREIGN PATENT DOCUMENTS

WO    WO 00/21239    4/2000

OTHER PUBLICATIONS

Shi, Weidong, et al. "Architectural support for high speed protection of memory integrity and confidentiality in multiprocessor systems." Proceedings of the 13th International Conference on Parallel Architectures and Compilation Techniques. (pp. 123-134). IEEE Computer Society, 2004.*

(Continued)

*Primary Examiner* — Kari Schmidt
(74) *Attorney, Agent, or Firm* — Aaron Chatterjee; Kate Drakos; Micky Minhas

(57) ABSTRACT

Various techniques are described to protect secrets held by closed computing devices. In an ecosystem where devices operate and are offered a wide range of services from a service provider, the service provider may want to prevent users from sharing services between devices. In order to guarantee that services are not shared between devices, each device can be manufactured with a different set of secrets such as per device identifiers. Unscrupulous individuals may try to gain access to the secrets and transfer secrets from one device to another. In order to prevent this type of attack, each closed computing system can be manufactured to include a protected memory location that is tied to the device.

13 Claims, 5 Drawing Sheets

(56) References Cited

U.S. PATENT DOCUMENTS

| | | | |
|---|---|---|---|
| 6,697,944 B1 | 2/2004 | Jones et al. | 713/168 |
| 7,010,808 B1 | 3/2006 | Leung et al. | 726/26 |
| 7,117,535 B1* | 10/2006 | Wecker | 726/29 |
| 7,370,202 B2* | 5/2008 | Appenzeller et al. | 713/171 |
| 7,761,922 B1* | 7/2010 | Baum et al. | 726/26 |
| 7,835,520 B2* | 11/2010 | Kumar et al. | 380/202 |
| 2002/0042796 A1* | 4/2002 | Igakura | 707/205 |
| 2002/0144131 A1* | 10/2002 | Spacey | 713/189 |
| 2002/0199110 A1* | 12/2002 | Kean | 713/189 |
| 2003/0079122 A1 | 4/2003 | Asokan et al. | 713/156 |
| 2003/0133574 A1* | 7/2003 | Caronni et al. | 380/277 |
| 2003/0159037 A1 | 8/2003 | Taki et al. | 713/168 |
| 2003/0163738 A1 | 8/2003 | Couillard | 718/184 |
| 2004/0122931 A1 | 6/2004 | Rowland et al. | 709/223 |
| 2004/0146163 A1 | 7/2004 | Asokan et al. | 380/277 |
| 2004/0250076 A1 | 12/2004 | Kung | 713/175 |
| 2005/0114683 A1 | 5/2005 | Jin et al. | 713/187 |
| 2005/0188190 A1* | 8/2005 | Cassorla et al. | 713/1 |
| 2006/0079333 A1* | 4/2006 | Morrow et al. | 463/43 |
| 2006/0101288 A1 | 5/2006 | Smeets et al. | 713/194 |
| 2007/0022469 A1* | 1/2007 | Cooper et al. | 726/3 |
| 2007/0162759 A1* | 7/2007 | Buskey et al. | 713/182 |
| 2007/0235517 A1* | 10/2007 | O'Connor et al. | 235/375 |
| 2008/0016230 A1 | 1/2008 | Holtmanns et al. | 709/229 |

OTHER PUBLICATIONS

Ashkenazi, A., David Akselrod, and Y. Amon. "Platform Independent Overall Security Architecture in Multi-Processor System-on-Chip ICs for Use in Mobile Phones and Handheld Devices." Automation Congress, 2006. WAC'06. World. (pp. 1-8). IEEE, 2006.*

Suh et al., "AEGIS: Architecture for Tamper-Evident and Tamper-Resistant Processing," CSAIL, http://csg.csail.mit.edu/pubs/memos/Memo-474/Memo-474.pdf, 2004, p. 1-16.

"An Overview of Secret Key and Identity Management for System-on-Chip Architects," Elliptic Semiconductor, Inc., http://www.ellipticsemi.com/pdf/whitepapers/Key_Management_Whitepaper.pdf, 2007, p. 1-8.

"Secure Your Embedded Devices," ATMEL Corporation, http://atnel.com/dyn/resources/prod_documents/doc6528.pdf, 2006, p. 1-18.

* cited by examiner

TAMPER EVIDENCE PER DEVICE PROTECTED IDENTITY

BACKGROUND

In an electronic ecosystem that includes closed computing systems such as cellular phones, cable set top boxes, or videogame consoles, a service provider may want to offer per device services to each user. For example, a service provider may want to offer many different services and would like to charge each user for each service the user elects to receive. If the service provider is able to individually identify each device in the ecosystem, it will have a way to offer per device services, e.g., different services for each device. In a specific example, a service provider such as a cable TV provider may provide different programming packages at different price levels. Two typical services in this example would be a basic programming service that includes basic content, and a premium tier service that provides additional movie channels. If the service provider can identify each device, i.e., a set-top cable box in this example, then the service provider can have a way to make sure only the customer that pays for the premium content is able to receive the premium content. In systems such as these, if there is a way to share the identity of the device that is authorized to receive premium content, and/or service keys with another device, then for example, there is a way to duplicate services that are enabled on one device on another device. More specifically, if a user can obtain the secrets held in the devices, then the user could transfer some, or all of the secrets to a second device.

In order to make this type of attack more difficult, the service provider can manufacturer the closed computing devices to include encrypted memory regions that store the identity of the devices and/or service keys operable to access the different content offered by a service provider. When services request the service keys, the devices can decrypt the encrypted memory regions with a key stored somewhere in the device, and retrieve the requested information. While encrypting the device identifiers and/or service keys makes an identity theft attack difficult, a determined individual can probably discover the keys used to encrypt and decrypt the memory regions. After the keys are discovered, an attacker could copy the contents of the protected memory region from a first device (a device authorized to receive premium content for example) to a second device, thus enabling the second device to receive premium content.

A service provider may attempt to frustrate attackers by using various additional security techniques. For example, this type of attack can be made more difficult by changing the keys that can be used to access content at predetermined intervals. In this example, a third party authority could transmit new keys to the devices thereby creating a moving target for attackers. For example, an attacker could successfully obtain a key; however the key would only be valid for a short period of time. While this system works, it does have drawbacks associated with it. For example, it requires that a signing authority transmit keys via a network connection where they can be intercepted. Another problem with this system is that the service provider may not be able to use any of this information as a root of trust since it is constantly being updated from sources outside the device. This would require that the devices rely on other information in order to determine whether they have been tampered with. Additionally, in most operational implementations using this technique, the service provider usually maintains control over all the services since the keys are constantly changing. For example, if the signing authority of the service provider is changing keys, then the signing authority will have to update the services and the device to use the new key pair. In the instance where the service provider does not control all the services, it would have to transmit the keys to the services where they could be intercepted by attackers.

SUMMARY

In an example embodiment of the present disclosure, a method is provided that includes, but is not limited to, storing, at a manufacturing location, content in a protected memory location of a device; storing, at the manufacturing location, a device specific number in the device; generating, at the manufacturing location, a hash of the content in the protected memory location and the device specific number; encrypting, at the manufacturing location, the hash using an asymmetric encryption key; and storing the hash in the protected memory location. In addition to the foregoing, other aspects are described in the claims, drawings, and text forming a part of the present disclosure.

In an example embodiment of the present disclosure, a closed computing system is provided that includes, but is not limited to, a device specific number stored in hardware of the closed computer system; and a computer readable storage medium including a protected memory location that contains content and a digital signature, wherein the digital signature was generated from the content in the protected memory location and the device specific number. In addition to the foregoing, other aspects are described in the claims, drawings, and text forming a part of the present disclosure.

In an example embodiment of the present disclosure, a method is provided that includes, but is not limited to, calculating a current hash value of current content in a protected memory location and a current device specific number; decrypting a digital signature, wherein the digital signature contains a prior hash value, the prior hash value calculated from prior content in the protected memory location and a prior device specific number; comparing the current hash value to the prior hash value; and retrieving a secret from the protected memory location when the current hash value is equal to the prior hash value. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
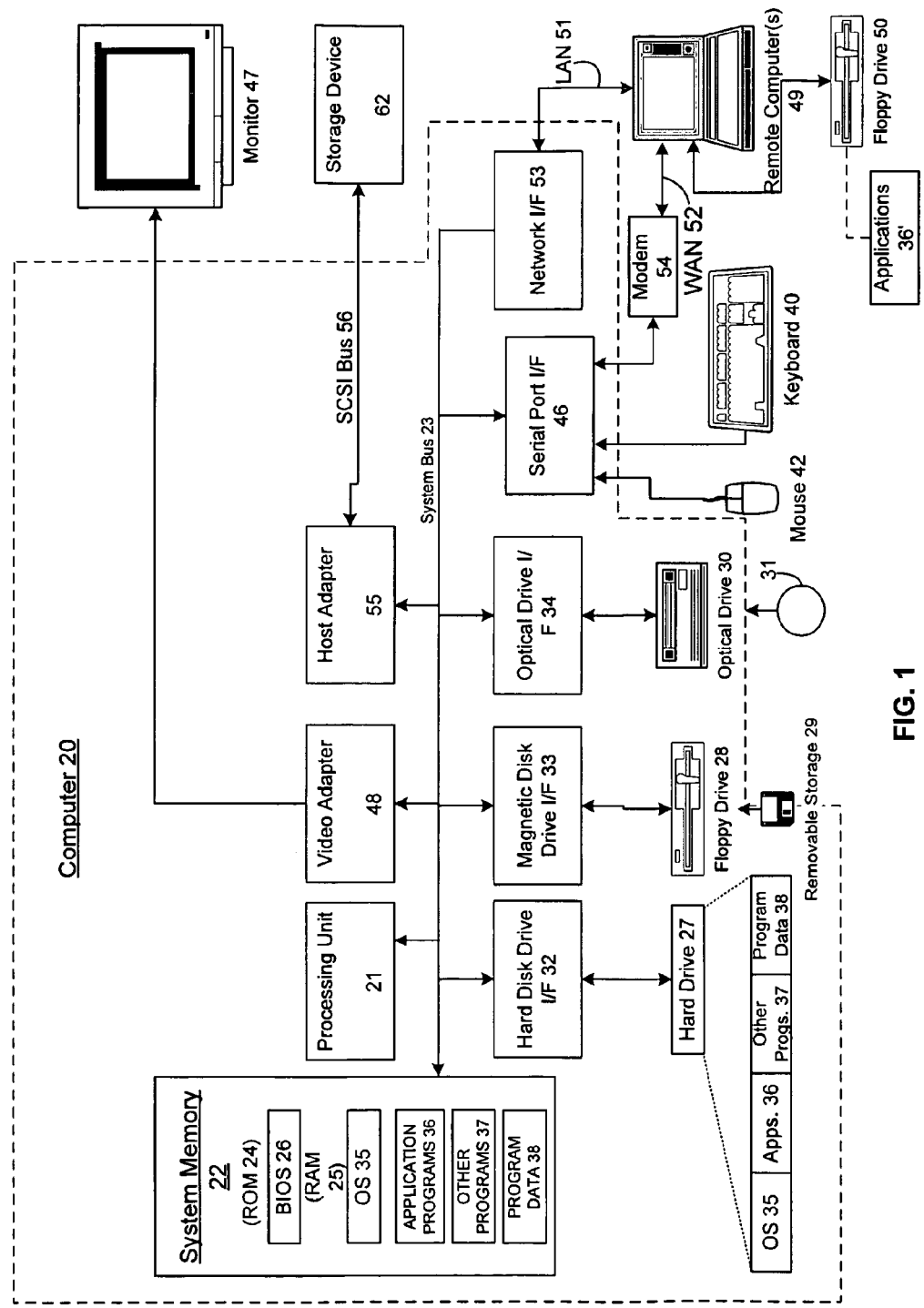
FIG. 1 depicts an example computer system wherein aspects of the present disclosure can be implemented.

Numerous embodiments of the present disclosure may execute on a computer. FIG. 1 and the following discussion are intended to provide a brief general description of a suitable computing environment in which the disclosure may be implemented. Although not required, the disclosure will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the disclosure may be practiced with other computer system configurations, including hand held devices, multi processor systems, microprocessor based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
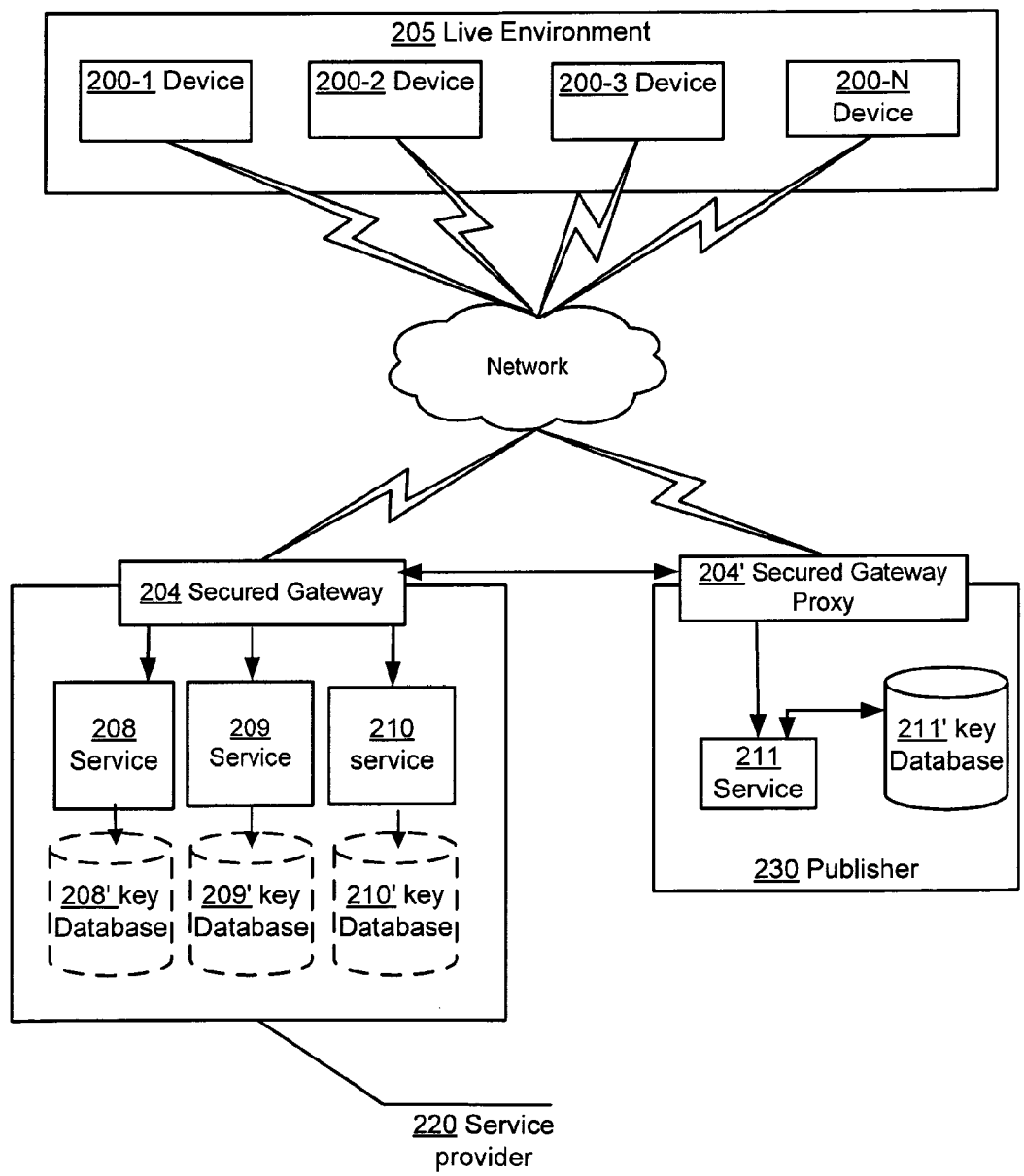
FIG. 2 depicts an example operational environment wherein aspects of the present disclosure can be implemented.

Referring now to FIG. 2, it depicts an example operational environment that can be used to practice aspects of the present disclosure. One skilled in the art will note that the example elements depicted in FIG. 2 are provided to illustrate an example operational context. One skilled in the art can also appreciate that elements indicated in dashed lines are considered optional and/or optionally located at their respective position. One skilled in the art will also appreciate that the example operational context is to be treated as illustrative only and in no way limit the scope of the claims.

As shown by FIG. 2, it depicts a plurality of devices 200-1 through 200-N (where N is an integer greater than 1) operating in a live environment 205, e.g., the devices 200-1 through 200-N have been sold and are operating in the ecosystem maintained by a service provider 220. In some instances, devices 200-1 through 200-N can be devices such as cellular phones, set-top boxes, VCRs, DVD players, videogame consoles, or any other closed computing devices that include components similar to those of personal computer 20 of FIG.

1. Continuing with the description, devices 200-1-200-N operating in the live environment 205 can be coupled via a network connection (similar to those described above in FIG. 1) to one or more services 208-210 offered by a service provider 220 and in some instances, service 211 offered by a third party publisher such as publisher 230. In this example, publisher 230 may want to host their own services in order to distinguish itself from competitors in the online ecosystem or other business related reasons. Devices 200-1 through 200-N can access service 211 in some instances after they are authenticated by a secured gateway 204 maintained by the service provider 220, and/or a secured gateway proxy 204'. For example, in some embodiments of the present disclosure, a secured gateway 204 can include a front end server operable to authenticate devices 200-1 through 200-N and prevent attacks on the services 208-209. Similarly, the secured gateway proxy 204' can in some embodiments include the same features as the secured gateway 204.

As depicted by FIG. 2, in some embodiments each service 208-211 can each be coupled to a key database 208'-211'. As illustrated by dashed lines, in some example embodiments the service provider 220 can maintain one key database that includes the keys of service 208'-210'. In some embodiments of the present disclosure, each service 208-211 can used public key cryptography in order to authenticate devices 200-1 through 200-N. For example and depending on the implementation, each key database 208'-211' can include either a public key, or a private key. Each key in the databases 208'-211' can be associated with a device identifier identifying which device 200-1 through 200-N has the corresponding key. When devices purporting to be specific devices connect to the services 208-211, the services 208-211 can challenge them with a request that they use their key to prove their identity. In a specific example, when a device purporting to be a device 200-1 connects to a service 208 and requests media, e.g., videogames, movies, songs, pictures, etc., the service 208 can invoke a process that can transmit one or more packets of information to the device 200-1 along with a request for the device 200-1 to digitally sign the information with its private key. The device 200-1 can sign the information and transmit the information back to the service 208. The service 208 can use the public key, for example, the key database 208' has associated with the device identifier of device 200-1 to decrypt the information. If it the public key is able to decrypt the information, then a process, thread, or circuitry and/or software, can be programmed to authorize the device 200-1 and allow it to access the media provided by service 208.

In another specific example, service 208 can send one or more packets of information to the device 200-1 to sign and the device 200-1 can encrypt the information using a public encryption key and transmit the encrypted information, along with its identifier back to the service 208. The service 208 can use the identifier of the device 200-1 to find a copy of the public key from the key database 208'. The service 208 can be configured to use an encryption algorithm to use the public key to encrypt the same information that it sent to the device 200-1. The service 208 can then invoke a process or thread to compare the encrypted information send from the device 200-1, to the information encrypted by the service 208. If the comparison process determines that there is a match, then the service 208 can authorize the device's request for media.

The strength of the security scheme protecting access to the media of services 208-211 depends on how secure the keys are stored on the devices 200-1 through 200-N. For example, if the keys and device identifiers are stored in plain text in the devices 200-1 through 200-N then there is nothing stopping an unscrupulous individual from changing the device identifier and keys. In order to prevent, or make such attacks difficult, the devices 200-1 through 200-N can use manufacturing techniques described below to prevent unscrupulous individuals from accessing, and/or tampering with information stored in the devices 200-1 through 200-N.

Figure 3:
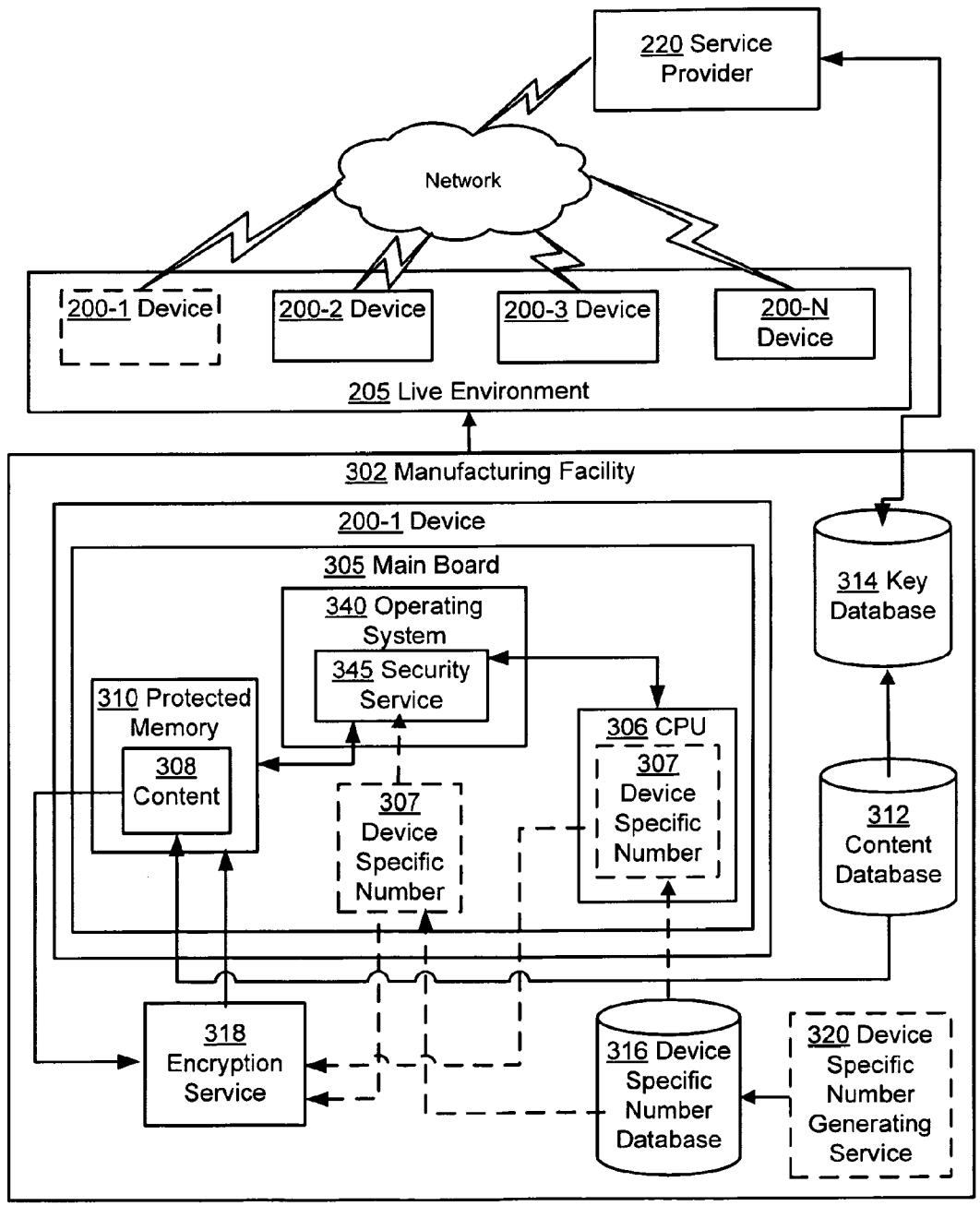
FIG. 3 depicts an example operational environment wherein aspects of the present disclosure can be implemented.

Referring now to FIG. 3, it depicts an example device 200-1 during a manufacturing process before it is placed into the live environment 205, e.g., the ecosystem. As once skilled in the art can appreciate, devices 200-2 through 200-N can be manufactured using similar techniques described with respect to device 200-1. As illustrated by FIG. 3, a company such as a service provider 220 can maintain, or affiliate with, a manufacturing facility 302 that is capable of producing devices 200-1 through 200-N. For example, the manufacturing facility 302 can include the equipment and employees necessary to create electronic components that can be placed in devices 200-1-200-N, or in other embodiments the manufacturing facility 302 can include the equipment and employees necessary to assemble components obtained from original design manufacturers (ODMs). More specifically, in one implementation the manufacturing facility 302 can purchase components such as memory 22, optical disk drives 30, hard drives 27, cases, or any other components illustrated by FIG. 1 from various ODMs and assemble them at a manufacturing facility 302.

As illustrated by FIG. 3, the device 200-1 can be loaded with an operating system 340 that includes a security service 345. For example, in some embodiments an operating system can be loaded onto a hard drive (not shown) of the device 200-1. The operating system, generally speaking, can include code that when executed by a CPU 306 can manage the hardware of the device 200-1. The security service 345 in some embodiments can include code operable to receive requests for information in the protected memory location 210 from a thread or process running in kernel space or user space, and determine if the contents of the protected memory location 210 have been modified.

During the manufacturing process, the device 200-1 can be fitted with a main board 305 and components can be attached to the main board 305 such as protected memory 310 and a CPU 306. In some instances, the protected memory location 310 can be effected by a region of memory such as read only memory, random access memory, flash memory, EPROM, EEPROM, or the like. In some example embodiments, the protected memory 310 can be an area of memory that is reserved by the device 200-1 to store content 308 such as sensitive information.

Protected memory 310 can in some embodiments of the present disclosure be considered protected because a manufacturing facility 302 has manufactured the device 200-1, and coded the operating system 340 so that the content 308 will be kept hidden from the user. The service provider 220 may want this information to be kept hidden because, for example, the content 308 in the protected memory location 310 can be used to differentiate between devices 200-1 through 200-N as they are connected to the ecosystem. For example, since most of components in the devices 200-1 through 200-N are the same, each device 200-1 through 200-N may include unique information in order for them to be distinguished by the service provider 220. If this information was easily discovered, e.g., if it was in plain text or written on the side of the devices 200-1 through 200-N, an unscrupulous individual may be able to modify the information and assume the identity of a different device, e.g., a device that has access to more services or a device that has not been blocked by the service provider.

After the protected memory location 310 is secured to the main board 305 the device 200-1 can be connected to a content database 312 so that content 308 can be stored in the protected memory location 310. For example, in some instances the content 308 stored on device 200-1 can include a device identifier, e.g., a random combination of letters and/or numbers that can be used by the service provider 220 to internally identify the device 200-1 as it is connected to the ecosystem. In a specific example, in some instances a device identifier can include a serial number. For example, the manufacturing facility 302 can include machinery or an employee that can connect the device 200-1 to a content database 312 that can include device identifiers, and transmit one to the device 200-1. After a device identifier is obtained from the content database 312, the identifier can be removed from a list of available identifiers.

In addition to placing a device identifier in a protected memory location 310, the content database 312 can transmit one or more keys associated with the device identifier to the device 200-1. For example, a computer program executing on a computer including similar components as personal computer 20 of FIG. 1 can be maintained by the manufacturing facility 302 can be configured to transmit one or more keys to the protected memory location 310. For example, in one implementation, device 200-1 can be provisioned with enough keys to last through its life cycle, e.g., the device 200-1 can include keys that can be used by current services such as services 208-211 of FIG. 2, and future services that the service provider 220 or a publisher 230 may intend to roll out at some time in the future. More specifically, when each device 200-1 through 200-N is created, it can be equipped with enough keys to access any number of services that are deployed by the service provider 220 or the publisher 230.

In some example embodiments, the keys placed in the protected memory location 310 of the device 200-1 can be private encryption keys of public/private key pairs, or in other embodiments they can be private decryption keys of a public/private key pair. In one example embodiment, a computer program executing on a computer maintained by the manufacturing facility 302 can store one or more private encryption keys on a device 200-1, and transmit the public decryption keys to a key database 314 along with the device identifier of device 200-1. The executing computer program can then delete the public/private key pairs in the content database 312, and await for the next device, for example, device 200-2 to be connected to the content database 312. In this example, the contents of the key database 314 can be transmitted to the service provider 220 and/or publisher 230. The service provider 220 and/or publisher 230 can then store the public decryption key associated with the identifier of device 200-1 in a key database such as key databases 208' through 211'.

Once device 200-1 is provisioned with content 308, in some embodiments of the present disclosure, a device specific number 307 can be placed in the device 200-1. For example, in some embodiments a device specific number 307 can be a random value generated by a number generator of a device specific number generating service 320 and stored in a database of device specific numbers 316. When device 200-1 is manufactured, a computer program executing on a computer maintained by the manufacturing facility 302 can select a number from the device specific number database 316 and store it in the device 200-1. As illustrated by the dashed lines in FIG. 3, in some instances the device specific number 307 can be stored in the CPU 306 or in another location on the main board 305. For example, in some example embodiments of the present disclosure, the device specific number 307 can be stored in the device 200-1 by directing a computer system to burn the number into the CPU 306 or on the main board 305 using one time writable storage. This implementation greatly increases the probability that the device specific number 307 will not be tampered with and the device specific number 307 can be used as a root of trust for processes that determine whether the device 200-1 is authorized to access services 208-211. More specifically, since it will be extremely difficult to modify the number, the device 200-1 and services 208-211 can use it to verify decisions made by the programs executing on the device 200-1. In other embodiments of the present disclosure, the computer program executing on a computer can store, e.g., transmit a device specific number 307 to the device 200-1 and the device specific number 307 can be stored in standard flash memory, EEPROM, or EPROM memory, etc. In these example embodiments it is less likely that the device specific number 307 will not be modifiable, e.g., flash containing the number could be removed and replaced, and is less reliable as a root of trust.

Once device 200-1 has been provisioned with a device specific number 307 and content 308, an encryption service 318 can be used to generate a digital signature using the content 308 and the device specific number 307. For example, a computer system similar to personal computer 20 described above with respect to FIG. 1 can include a program that includes a key generation algorithm that can create public decryption and private encryption key pairs. In some embodiments, a copy of the device specific number 307 can be stored in the protected memory location 310 and the entire store can be encrypted by the encryption service 318 using the private encryption key. The encryption service 318 can then transmit the public key to the device 200-1 and the public decryption key can be stored in memory, or the CPU 306 of the device 200-1. In some example embodiments, after the protected memory 310 is encrypted, the encryption service 318 can destroy the private encryption key, or store it in a secured database located at the manufacturing facility 302. In these embodiments, since the device 200-1 can be provisioned to include enough keys for its life cycle, there will not be a need to update the content 308 after the device has shipped, and there will not be a reason to change anything in the protected memory 310. Thus, in at least one embodiment there will not be a need to keep the encryption key after the protected memory 310 has been encrypted and the key can be destroyed.

In another example embodiment, the encryption service 318 can include a program that includes key generation algorithm that uses a cryptographic hash function such as SHA-1. For example, in some example embodiments an encryption service 318 can use a cryptographic hash function that takes input such as the content 308 in the protected memory 310, and the device specific number 307 to generate a hash value. In this example, a hash generated from the content 308 and the device specific number 307 can then be encrypted using a private encryption key and the key can either be deleted or stored in a database maintained by the manufacturing facility 302. The encrypted hash can then be embedded in the protected memory 310 of the device 200-1 and the public key can be stored in the CPU 306, in read only memory, or another memory location of the device 200-1. In this case, the content 308 of the device 200-1 can not be changed without breaking the hash, i.e., if a device identifier, or a key is changed in content 308, then a hash of the content 308 and device specific number 307 will not match the decrypted hash stored in the protected memory location 310.

In some embodiments of the present disclosure, where the device specific number is either used in the cryptographic function to create the hash, or is stored in the content 308, there is a strong cryptographic tie between the hardware of the device 200-1 and the content 308 of the protected memory location 310. This tie is strengthened in embodiments where the device specific number 307 can not be easily removed from the device 200-1. For example, if the device specific number 307 is easily removed from the device 200-1, an unscrupulous individual could copy everything in the protected memory location 310 of a second device 200-2 including the encrypted hash to a protected memory location 310 of device 200-1. The unscrupulous individual could then remove the device specific number 307 from the second device 200-2 or copy it (if it is stored in easily modifiable memory) and place it in device 200-1. In this example device 200-1 could then completely assume the identity of device 200-2 and have access to any of the services 200-2 has access to. If however, the device specific number 307 is stored in one time writable storage in the CPU 306 or on the main board 305, then it will be almost impossible to copy or remove the number, and place it in the second device 200-2 without damaging the devices involved in the attack.

In some embodiments of the present disclosure, the ability to completely swap content 308 from one device 200-1 to another device 200-2 can be made more difficult by making the device specific number 307 either a symmetric key or a public decryption key of a public private key pair, and configuring a security service 345 to use the key to decrypt the protected memory location 310. In this embodiment, a device specific number generating service 320 can include components similar to personal computer 20 of FIG. 1 and a program that includes a key generating algorithm configured to either create symmetric keys, public decryption keys/private encryption keys, or in other embodiments, public encryption keys/private decryption keys. One skilled in the art can appreciate that the selection of a symmetric key or asymmetric key to use as the device specific number 307 depends upon the specific implementation desired by an implementer. Systems that include private/public keys tend to be more secure, however they tend to require more intensive calculations and take longer than symmetric encryption/decryption processes. Thus, an implementer may decide that a reduced level of security is desired since it is accompanied by faster processing times and opt to make the device specific number 307 a symmetric key. In this example, the protected memory location 310 can be encrypted using the device specific number 307. The strength of this layer of encryption depends in some embodiments on the location of the device specific number 307. For example, a device specific number 307 stored in flash memory coupled to the main board 305 can be easily removed, replaced, or viewed and modified, whereas a device specific number 307 stored in one time writable storage in the CPU 306 will be hard to discover and alter. In example embodiments where the device specific number 307 is a symmetric key, an unscrupulous individual would have to discover it in order to decrypt the contents of the protected memory location 310 thus adding another layer of security to the device 200-1.

Figure 4:
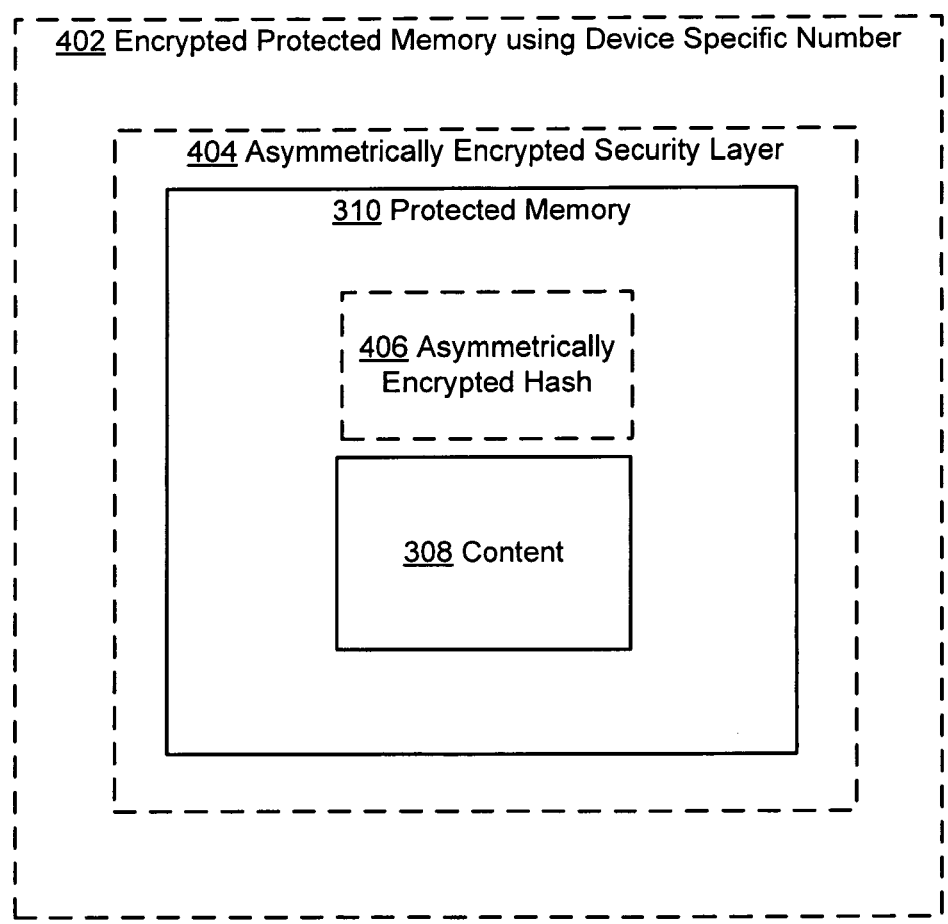
FIG. 4 depicts an example protected memory location of a device including example layers of security protecting an exemplary protected memory location.

Referring now to FIG. 4, it depicts an example protected memory location 310 of a device 200-1 including example layers of security that can protect content 308. As illustrated by 402, in some embodiments of the present disclosure, in order to access content 308 stored in protected memory, an attacker may, in one optional implementation, discover that the protected memory location 310 is encrypted with a symmetric key, or a public decryption key stored on the device 200-1. The attacker may search the device 200-1, discover the key, and use it to remove the first layer of encryption protecting the protected memory 310. In embodiments that include this layer of protection, the strength of it depends on how difficult it is to obtain the key. For example, a symmetric key stored in one time writable storage will be more difficult to obtain than a symmetric key stored in removable flash memory.

Continuing with the description of FIG. 4, if an encryption layer that uses the device specific number 307 is compromised, or it never existed, an attacker can access the protected memory 310. In some embodiments of the present disclosure, and illustrated by 404, an attacker that successfully overcomes the encryption layer in 402, if it existed, will find that the content 308 has been over encrypted by another layer of security. In this example, an asymmetric encryption key could have been used during the manufacturing process to encrypt the content 308 of the protected memory location 310. In this example, an attacker would have to search the device 200-1 to find the public decryption key that can be used to decrypt the content 308. Similar to above, the strength of this layer can also depend on how difficult it is to obtain the public key. If an attacker can successfully obtain the public key, they can use it to decrypt the content 308 and see the secrets held in the protected memory 310. In this example embodiment, the device specific number 307 can be stored in content 308. In this example embodiment, since the device 200-1 only includes the public decryption key, an attacker in this example would not be able to re-encrypt the content 308 after modifying some, or all, of the content 308. If the security service 345 is configured to decrypt the content 308 as part of the security routine that checks to see if the device 200-1 has been tampered with, and the content 308 is already decrypted, then circuitry or a combination of circuitry and software can determine that the device 200-1 has been tampered with and perform a predetermined action.

In another example, the protected memory location 310 could be encrypted as shown by 402, and if an attacker that successfully overcomes this layer of encryption, if it existed, and as illustrated by 406, the attacker could discover the content 308 and an asymmetrically encrypted hash. For example, in this embodiment an encryption service 318 could have used a private encryption key during the manufacturing process to encrypt a hash of the content 308 and the device specific number 307, and the hash could have been embedded in the protected memory 310. The public decryption key could have been stored in the device 200-1 in one of a variety of locations, e.g., CPU 306, memory, or in a smart chip connected to the main board 305. In this example embodiment, if the attacker is able to obtain the public decryption key, and decrypt the hash, the attacker could view the hash and the secrets contained in the protected memory location 310. Since the device 200-1 in this example may only include the public decryption key, an attacker in this example would not be able to modify the content 308 without breaking the hash, and the attacker would not be able to re-encrypt a modified hash. Thus, if a security service 345 is configured to decrypt the asymmetrically encrypted hash and compare it to the current hash value of the content 308 and the current hash is different than the decrypted hash, then circuitry or a combination of circuitry and software can determine that the device 200-1 has been tampered with, and perform a predetermined action.

Figure 5:
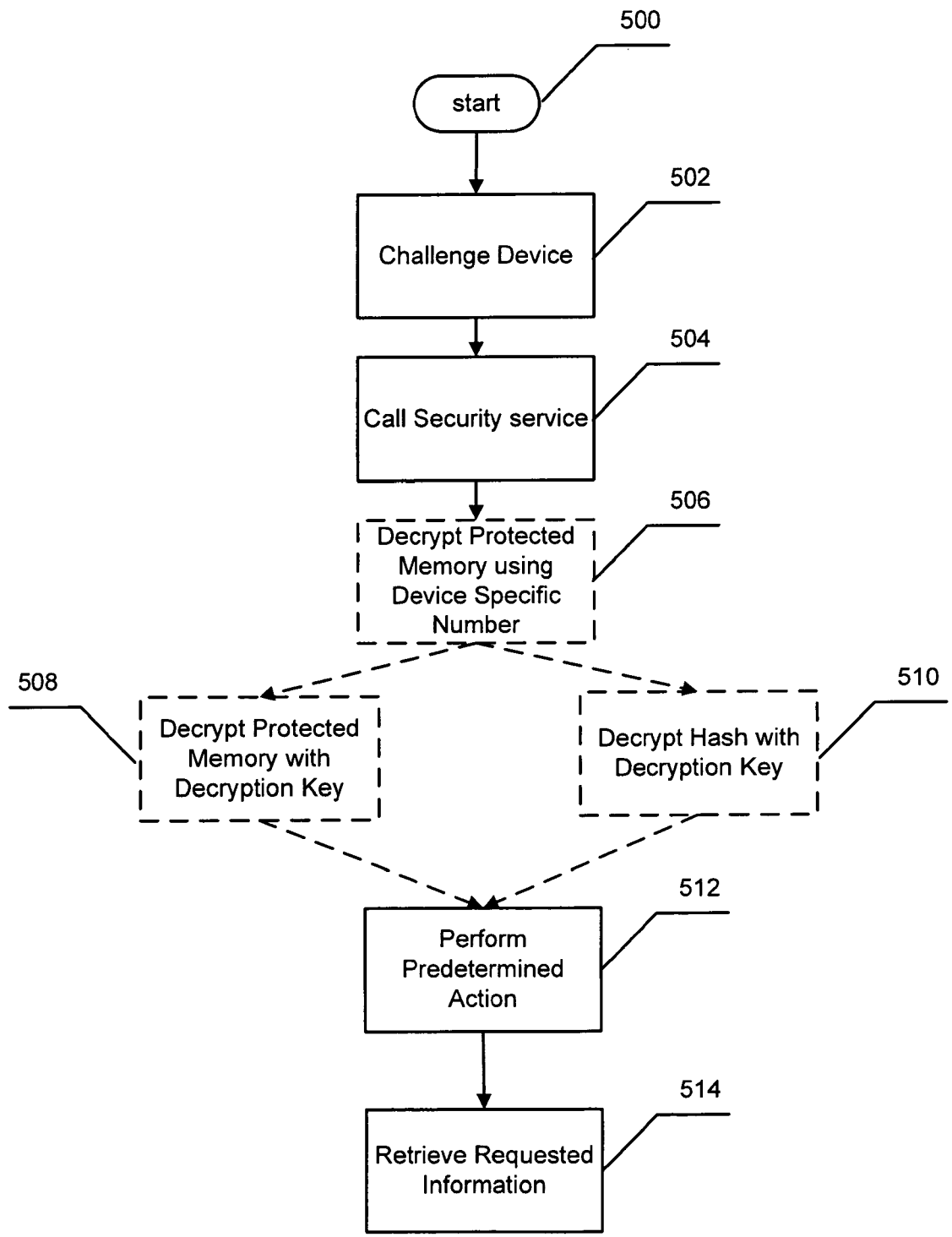
FIG. 5 depicts an example operational procedure depicting aspects of the present disclosure.

Referring now to FIG. 5, in conjunction with FIG. 2, and FIG. 3, it depicts an example operational procedure depicting aspects of the present disclosure. As illustrated by FIG. 5, operation 500 begins the operational procedure and operation 502 illustrates challenging a device 200-1. For example, when a device 200-1 attempts to access a service offered such as service 208, the secured gateway 204 of the service provider 110 can authenticate the device 200-1 and route the service request to the specific service, e.g., service 208. Service 208 can be equipped with hardware and software configured to effect a service such as a High Definition movie download service. The service 208 can include high definition 'HD' movies, and can allow users to subscribe to a download service where the user can download movies and view them on their device 200-1 for a limited time. When a device purporting to be device 200-1 accesses the service 208, the service 208 can include an authentication process configured to determine whether the device 200-1 has a valid subscription to the service 208 prior to transmitting an HD movie to the device 200-1, and is actually device 200-1 as opposed to a device purporting to be device 200-1. In one embodiment, the service 208 can transmit one or more packets of information indicative of a request for the device identifier of device 200-1, and to digitally sign a data package.

Continuing with the example operational procedure, at operation 504, an Network adaptor of the device 200-1 can receive the request and the operating system 340 can call a process to obtain the device identifier from the protected memory location 310. A security service 345 can trap the call and access the protected memory location 310. In some embodiments, the protected memory location 310 can be over encrypted with a device specific number 307 as shown by optional operation 506. In these example embodiments, the code that effects the security service 345 can be processed by the CPU 306 and the device specific number 307 can be used to decrypt the protected memory location 310.

In one example embodiment, the result of the decryption process can reveal content 308, in other embodiments the result of the decryption process in operation 504 can reveal a further encrypted protected memory location 310 as illustrated by operation 508. In this optional operation, the protected memory location 310 can in some embodiments be asymmetrically encrypted with a private encryption key that can be either held by the manufacturing facility 302, or destroyed. The security service 345 can be configured to check to see if the protected memory location 310 is encrypted, and if it is, it can decrypt it otherwise it can determine that the protected memory location 310 has been modified and refuse to operate. For example, if an attacker is able to decrypt the asymmetrically encrypted protected memory location 310, then they could potentially change some or all of the content 308. In this example, since the encryption key is not available, and the security service 345 can be configured to only process encrypted information, then an attacker would not be able to change any of the content 308. In some embodiments, the security service 345 can be configured to compare the device specific number stored, for example, in the CPU 306 to a copy of the device specific number 307 stored in the content 308. In this example, since the content 308 can not be modified and re-encrypted if the device specific number 307 stored in content 308 is different than the device specific number 307 stored in, for example, the CPU 306 the security service 345 can be configured to determine that an attacker has swapped an asymmetrically encrypted protected memory location from one device to another and the security service 345 can be configured to perform a predetermined action.

As shown by operation 510, in some instances the result of the decryption process illustrated by operation 506 can result in revealing a protected memory location 310 that can include content 308, and an asymmetrically encrypted hash of the content 308 and the device specific number 307. In this example embodiment, the security service 345 can be configured to use a cryptographic hash function that takes the current content 308 and the current device specific number 307 as input to generate a hash value. The security service 345 can additionally include a process or thread configured to use a public decryption key to decrypt the asymmetrically encrypted hash embedded in the protected memory location 310. After the hash is decrypted, it can be compared to the hash value calculated by the cryptographic hash function. If the hash values are different, the security service 345 can be configured to determine that either the device specific number 307 or the content 308 has been modified and perform a predetermined action.

As illustrated by operation 512, when the security service 345 has determined that the device 200-1 has been tampered with it can be programmed to perform one of a plurality of actions. For example, in one example embodiment if a device 200-1 determines that it has been modified, it can simply shut down and a bit can be set in hardware that configures the device 200-1 to refuse to load the operating system. In another example, the operating system can be configured to transmit one or more packets of information to the service provider 200 that indicates that the device 200-1 has been compromised. In this example, the service provider 220 can ban the device identifier associated with the device 200-1, and any keys that the device 200-1 currently includes, or was manufactured with. In yet another example, a bit can be set in hardware that identifies to the operating system 340 that directs the operating system 340 to refuse to connect to any services such as services 208-211. In this example, a modified device can still be used by the user, however it will not be able to access the ecosystem maintained by the service provider 220.

As illustrated by operation 514, if the security service 345 determines that the device 200-1 has not been modified, then the security service 345, for example, can be configured to retrieve the device identifier and an encryption key used by the HD service 208. A cryptographic hash function can be used by the operating system 340 to encrypt the data package sent from the service 208 and the Network adaptor of the device 200-1 can be configured to transmit one or more packets of information indicative of the encrypted data package and device identifier to the service 208. The HD service 208 in this example operational procedure can search a key database 208' for the device identifier and retrieve the decryption key associated with the device's identifier. The service 208 in this example can then use a decryption algorithm to decrypt the data package using a public decryption key and if the decryption operation is successful, then the service 208 can be configured to allow the device 200-1 to access its content, e.g., the HD movies in this example.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for manufacturing a closed computing device, comprising:
   storing, during a manufacturing of a device, content in a protected memory location effectuated by non-volatile storage of the device,
   wherein the content includes a device identifier and a plurality of asymmetric service keys used to access at least one or more services;
   burning, during the manufacturing of the device, a device specific number for the device into one-time writable storage in the device;
   generating, during the manufacturing of the device, a hash based on the content in the protected memory location of the device and the burnt in device specific number;
   encrypting, during the manufacturing of the device, the hash using one of the plurality of asymmetric service keys; and
   storing the encrypted hash in the protected memory location.

2. The method of claim 1, wherein burning the device specific number further comprises:
   burning the device specific number into one-time writable storage inside a processor of the device.

3. The method of claim 1, wherein the device specific number is a symmetric key.

4. The method of claim 3, further comprising:
   encrypting the protected memory location using the symmetric key.

5. A closed computing system, comprising:
   a processor;
   a one-time writable storage device including a device specific number burned therein; and
   a computer-readable storage medium coupled to the processor, the computer-readable storage medium including a protected memory location that contains content, wherein the content of the protected memory location includes a device identifier and a plurality of asymmetric service keys used to access at least one or more services;
   the computer-readable storage medium including executable instructions that upon execution cause the closed computing system to:
      generate a digital signature by encrypting a hash of the content in the protected memory location and the burnt in device specific number by using one of the plurality of asymmetric service keys used by a manufacture of the closed computing system; and
      store the digital signature in the protected memory location.

6. The closed computing system of claim 5, wherein the protected memory location is encrypted using the device specific number.

7. The closed computing system of claim 5, wherein the one-time writable storage is a part of the processor.

8. The closed computing system of claim 5, wherein the device identifier is used to identify the closed computer system to a service provider.

9. A computer-readable storage device including executable instructions that upon execution cause a processor to perform the instructions comprising:
   reading a current device specific number burned into a one-time writable storage;
   calculating a current hash value based on current content in a non-volatile protected memory location of the device and based on the current burnt in device specific number, wherein the current content includes a deceive identifier and a plurality of asymmetric service keys used to access at least one or more services;
   decrypting a digital signature, wherein the digital signature contains a prior hash value calculated from prior content in the non-volatile protected memory location and a prior device specific number;
   comparing the current hash value to the prior hash value; and
   retrieving a secret from the non-volatile protected memory location when the current hash value is equal to the prior hash value.

10. The computer-readable storage device of claim 9, the instructions further comprising:
    performing a predetermined action when the current hash value is not equal to the prior hash value.

11. The computer-readable storage device of claim 9, wherein the digital signature is embedded in the non-volatile protected memory location.

12. The computer-readable storage device of claim 11, the instructions further comprising:
    decrypting the current content of the protected memory location using the device specific number.

13. The computer-readable storage device of claim 9, the instructions further comprising:
    receiving a data package;
    calculating a hash of the data package;
    encrypting the hash using the asymmetric service key;
    transmitting the encrypted hash to the service provider; and
    receiving media from the service provider.

* * * * *